UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

GREEN-BLACK DYE AND PROCESS OF MAKING SAME.

SPECIFICATION forming part of Letters Patent No. 619,114, dated February 7, 1899.

Application filed May 20, 1898. Serial No. 681,253. (No specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of New Mordant-Dyeing Coloring-Matters, of which the following is a specification.

As is well known, naphthazarin can be prepared by heating 1.5-dinitronaphthalene with concentrated or fuming sulfuric acid, with or without the addition of reducing agents. In this manufacture a body is formed which is known as the "naphthazarin intermediate product." The chemical constitution of this body has never been definitely ascertained and described, and the substance is known under this name only both in patents and in general scientific literature. It is more particularly described in the specification of the German Patent No. 76,922, published on August 21, 1894, in the following terms: Its solution in concentrated sulfuric acid (containing about ninety-five per cent. $H_2SO_4$) is brown. In dilute sulfuric acid it dissolves with a pure blue color. This color is not appreciably changed on adding caustic-soda lye; but if an excess of hydrochloric acid be added to the dilute sulfuric-acid solution the color turns to a greenish brown. When isolated, this naphthazarin intermediate product is a violet powder, possessing a metallic luster, slightly soluble in water and giving a blue solution, which is not changed in color by the addition of sodium carbonate or of a caustic-soda lye. In the presence of a little hydrochloric acid it dissolves readily with a pure blue color. If the solution in dilute sulfuric acid be boiled, the blue color changes to red and on cooling naphthazarin separates out. It is this naphthazarin intermediate product, which can be obtained, as described, from 1.5-dinitro-naphthalene, which constitutes the initial material for my invention. I prepare from it a new series of mordant-dyeing coloring-matters by combining it with phenol bodies. When manufacturing, a phenolic body is preferably added to the ordinary naphthazarin melt produced by the treatment of 1.5-dinitronaphthalene with sulfuric acid and which contains the said intermediate product in sulfuric-acid solution.

The phenolic bodies which I have used in carrying out my invention are phenol itself or its derivatives—for instance, cresol, resorcinol, phenol-carbonic acids, phenol-sulfoacids, nitrophenols, halogen substituted phenols and the like, alpha- and beta- naphthol and the derivatives thereof—as, for instance, naphtholsulfoacids, naphthol-carbonic acids, dioxy-naphthalenes, nitro-naphthols, and the like—and I desire to protect by these Letters Patent the process of manufacture of the new series of dyes from these various phenolic bodies, which I have discovered to be equivalent with one another for the purpose of this process; also, generically, the new products so obtained and, specifically, the new dyestuff from naphthazarin intermediate product from 1.5-dinitro-naphthalene and phenol itself.

The following example will illustrate the manner in which my invention can be carried into practical effect and a new coloring-matter obtained which dyes chrome-mordanted wool, giving green-black shades.

Example: Prepare a naphthazarin melt in the usual way—that is, by heating 1.5-dinitro-naphthalene with concentrated or fuming sulfuric acid, with the addition of a reducing agent. To about one thousand parts of this melt obtained by the use of about fifty parts of dinitro-naphthalene add about fifty parts of phenol at the ordinary temperature. Stir the mixture thoroughly for about twenty-four hours, while raising the temperature to about 50° centigrade and maintaining this temperature. A test portion of the melt when the reaction is complete should dissolve in ice-water, yielding a green solution, so that by taking test portions from time to time and dissolving them in ice-water one may obtain guidance as to the course of the reaction. Pour the melt thus obtained onto about two thousand parts of ice. If it be desired to obtain the new coloring-matter as pure as possible, the solution is immediately filtered. Allow the filtrate to stand. The new coloring-matter separates in the form of a dark-colored crystalline powder. Collect by filtering, wash, and dry.

If the first filtration after dissolving the melt be omitted, the product obtained is less pure, but can still be used for dyeing.

Instead of phenol itself the equivalent phenolic bodies already mentioned can be used without changing the process.

My new group of coloring-matters possess the following generic properties: They form a dark powder or paste insoluble in benzene, soluble in hot water, easily soluble in dilute caustic soda and sodium carbonate, and capable of yielding soluble bisulfite compounds. They are soluble in cold anilin with a violet to blue color. By reduction without being split up they are converted into leuco compounds. They dissolve in concentrated sulfuric acid, giving solutions ranging from violet through red to brownish red.

My new dyestuff, which I desire to claim specifically, when in the form of powder has a grayish-brown appearance. It is soluble in water, yielding a violet-blue solution. The solution in concentrated sulfuric acid is violet in color. It yields a violet-blue solution in alcohol and a blue solution in anilin. It dyes chrome-mordanted wool greenish-black shades.

Now what I claim is—

1. The process for the manufacture of a new series of coloring-matters which consists in heating 1.5-dinitro-naphthalene with sulfuric acid so as to obtain the well-known naphthazarin intermediate product, and adding to the sulfuric-acid solution of this body a phenolic body, substantially as described.

2. As a new article of manufacture the series of coloring-matters which can be obtained by heating 1.5-dinitro-naphthalene with sulfuric acid so as to obtain the naphthazarin intermediate product and adding to the sulfuric-acid solution of this compound the phenolic body, and which forms a dark powder or paste, soluble in hot water, in caustic soda and sodium carbonate, and yields a soluble bisulfite compound on treatment with sodium bisulfite, and with cold anilin gives a color within the range of violet to blue.

3. As a new article of manufacture the new coloring-matter which can be obtained by heating 1.5-dinitro-naphthalene with fuming sulfuric acid, so as to obtain the naphthazarin intermediate product, and adding phenol to the sulfuric-acid solution of this substance, and which dissolves in water giving a violet-blue solution and in caustic soda and sodium carbonate, and yields a soluble bisulfite compound on treatment with sodium bisulfite, and gives a blue color in cold anilin substantially as described.

In testimony whereof I have hereunto set my hand in the presence of two subscribing witnesses.

OSCAR BALLY.

Witnesses:
GUSTAV LICHTENBERGER,
ADOLPH REUTLINGER.